(12) United States Patent
Suzuki

(10) Patent No.: US 11,772,793 B2
(45) Date of Patent: Oct. 3, 2023

(54) FLYING OBJECT WITH ELONGATED BODY

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 439 days.

(21) Appl. No.: 17/260,184

(22) PCT Filed: Jul. 19, 2018

(86) PCT No.: PCT/JP2018/027051
§ 371 (c)(1),
(2) Date: Jan. 13, 2021

(87) PCT Pub. No.: WO2020/016979
PCT Pub. Date: Jan. 23, 2020

(65) Prior Publication Data
US 2021/0291981 A1 Sep. 23, 2021

(51) Int. Cl.
B64C 39/02 (2023.01)
B64D 27/24 (2006.01)
B64U 10/13 (2023.01)
B64U 50/19 (2023.01)

(52) U.S. Cl.
CPC ............ *B64C 39/024* (2013.01); *B64D 27/24* (2013.01); *B64U 10/13* (2023.01); *B64U 50/19* (2023.01)

(58) Field of Classification Search
CPC .. B64C 39/024; B64U 10/13; B64U 2101/30; B64U 2101/25; B64U 2101/26; B64U 2101/28; B64U 2101/29; B64U 2101/31; B64U 2101/32

USPC ....................................................... 244/17.23
See application file for complete search history.

(56) References Cited

U.S. PATENT DOCUMENTS

| 2020/0079487 | A1* | 3/2020 | Shim ........................ B64B 1/58 |
| 2020/0164966 | A1* | 5/2020 | Suzuki .................. B64D 47/08 |
| 2020/0377207 | A1* | 12/2020 | Suzuki .................... B64C 27/54 |
| 2021/0112722 | A1* | 4/2021 | Maor .................... G08G 5/0073 |
| 2022/0142422 | A1* | 5/2022 | Giarritta ............. A47L 11/4091 |
| 2022/0169387 | A1* | 6/2022 | Van Der Steur ...... B05B 12/122 |
| 2022/0411052 | A1* | 12/2022 | Angelucci .............. B64U 10/14 |

(Continued)

FOREIGN PATENT DOCUMENTS

| CN | 109640621 A | * | 4/2019 | .......... A01D 46/253 |
| EP | 4169621 A1 | * | 2/2021 | |
| EP | 4134306 A1 | * | 2/2023 | |

(Continued)

*Primary Examiner* — Christopher P Ellis

(57) ABSTRACT

To provide a flying object in which a working part can be close to an operation target at an appropriate distance the flying object according to the present disclosure includes a flight part including at least a plurality of rotary wings and a motor for driving the rotary wings, a main body elongated in a vertical direction, and a connection part that connects the flight part and the main body in a mutually displaceable manner, wherein a total length of the main body in the vertical direction is at least twice a maximum diameter of the flight part in a horizontal direction. The main body has an upper part that is provided above the connection portion, and a lower portion that is provided below the connection portion, and the length of the upper part is three times or more the length of the lower part.

19 Claims, 11 Drawing Sheets

(56) References Cited

U.S. PATENT DOCUMENTS

| | | | | |
|---|---|---|---|---|
| 2023/0126449 A1* | 4/2023 | Suzuki | ................... | B64C 27/08 |
| | | | | 244/17.23 |
| 2023/0137157 A1* | 5/2023 | Fukushima | ............. | B64C 27/04 |
| | | | | 244/17.11 |

FOREIGN PATENT DOCUMENTS

| | | | | | |
|---|---|---|---|---|---|
| JP | 2016133508 | A | | 7/2016 | |
| JP | 2016203926 | A | | 12/2016 | |
| JP | 2016219941 | A | | 12/2016 | |
| JP | 2017177978 | A | | 10/2017 | |
| JP | 2017193331 | A | | 10/2017 | |
| JP | 2018030430 | A | | 3/2018 | |
| JP | 2022029823 | A | * | 2/2022 | ............. B60L 53/18 |
| KR | 20230058025 | A | * | 6/2019 | |
| WO | WO2016185572 | A1 | | 11/2016 | |
| WO | WO-2016185572 | A1 | * | 11/2016 | ............... B64C 1/36 |
| WO | WO-2018033925 | A1 | * | 2/2018 | ........... A01D 46/253 |
| WO | WO-2019021414 | A1 | * | 1/2019 | ............. B64C 17/02 |
| WO | WO-2020159384 | A1 | * | 8/2020 | ............. B64C 39/00 |
| WO | WO-2022054056 | A1 | * | 3/2022 | ........... B64C 39/024 |

* cited by examiner

[FIG. 1]
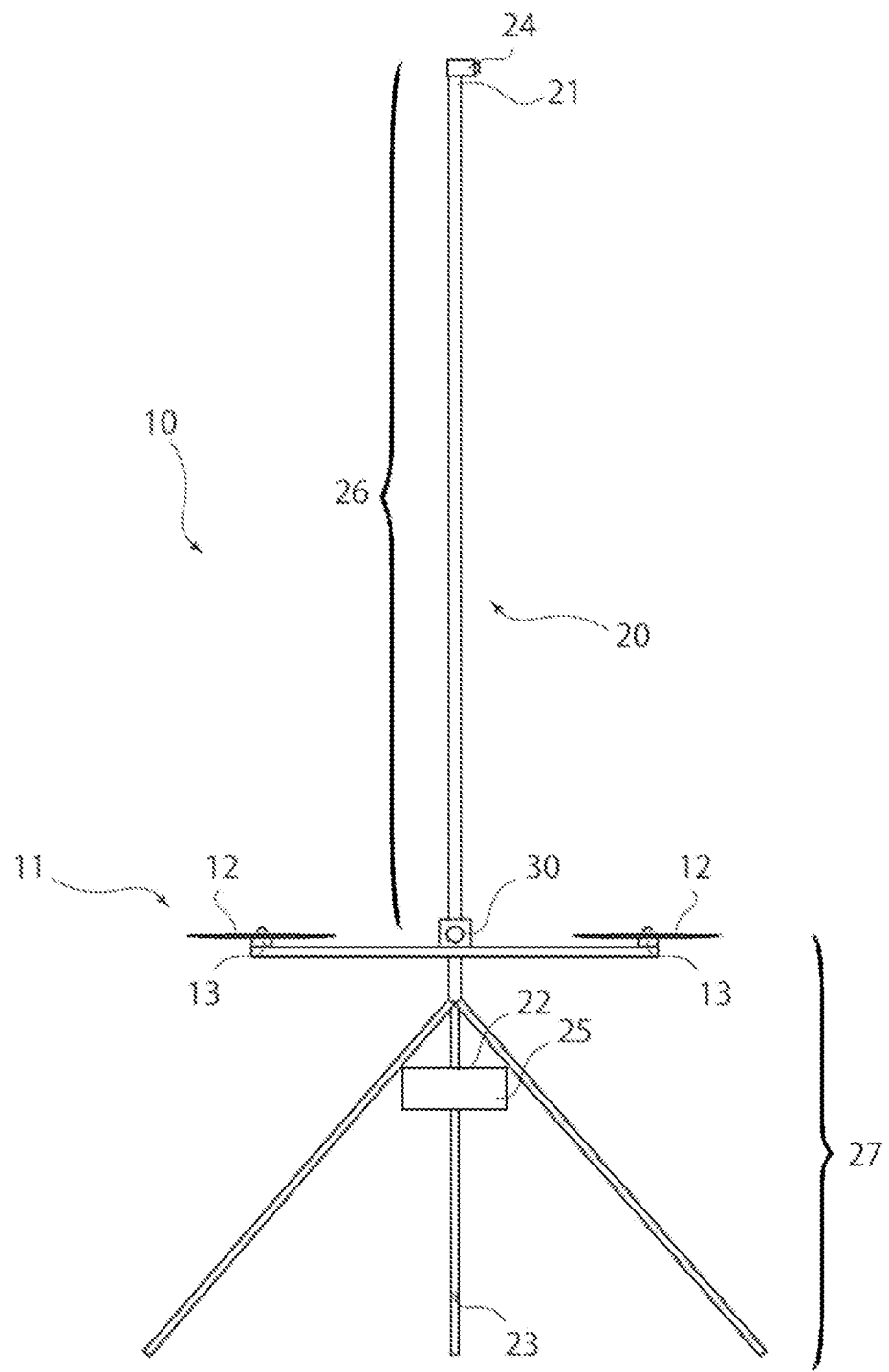

[FIG. 2]
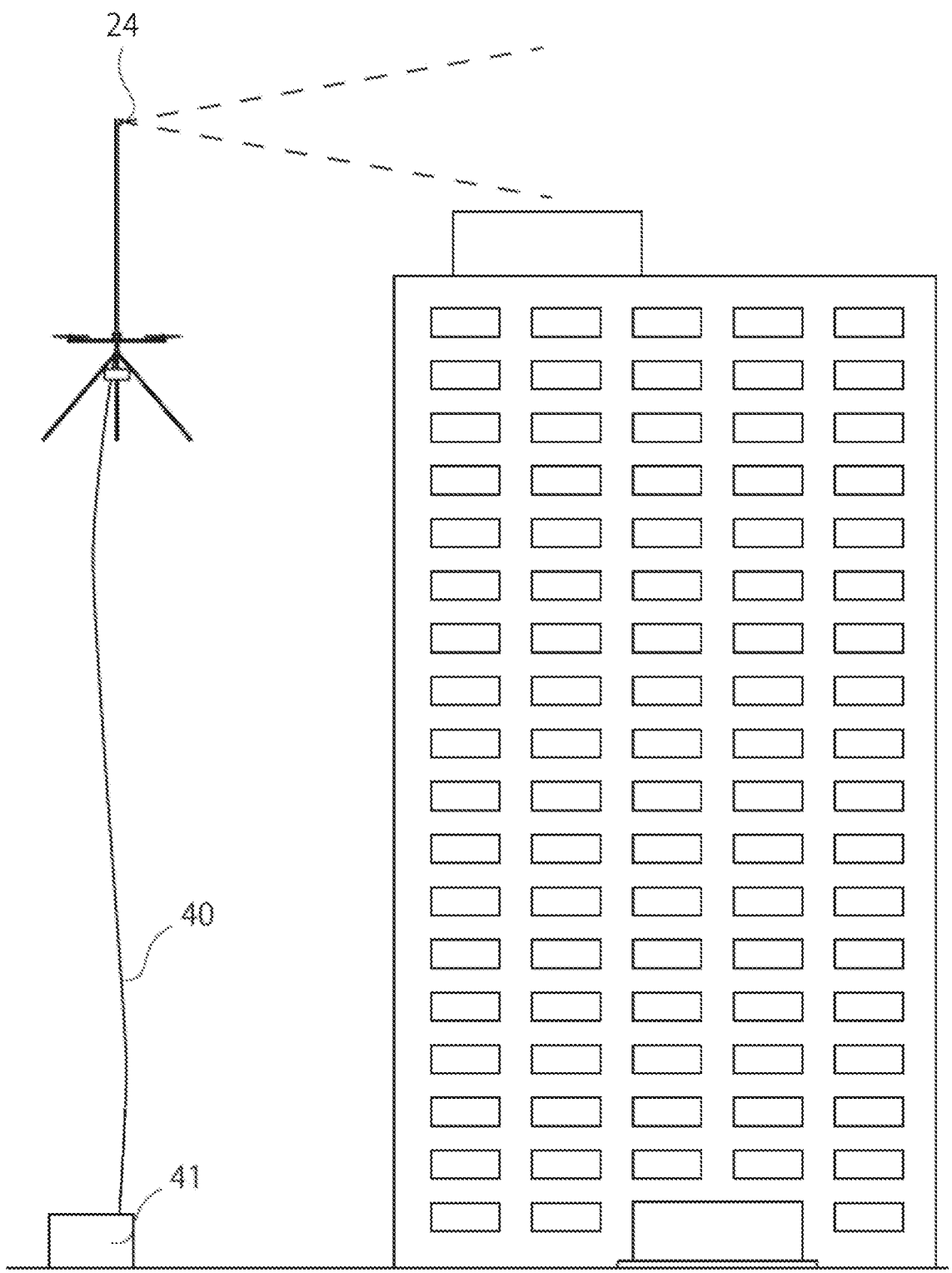

[FIG. 3]
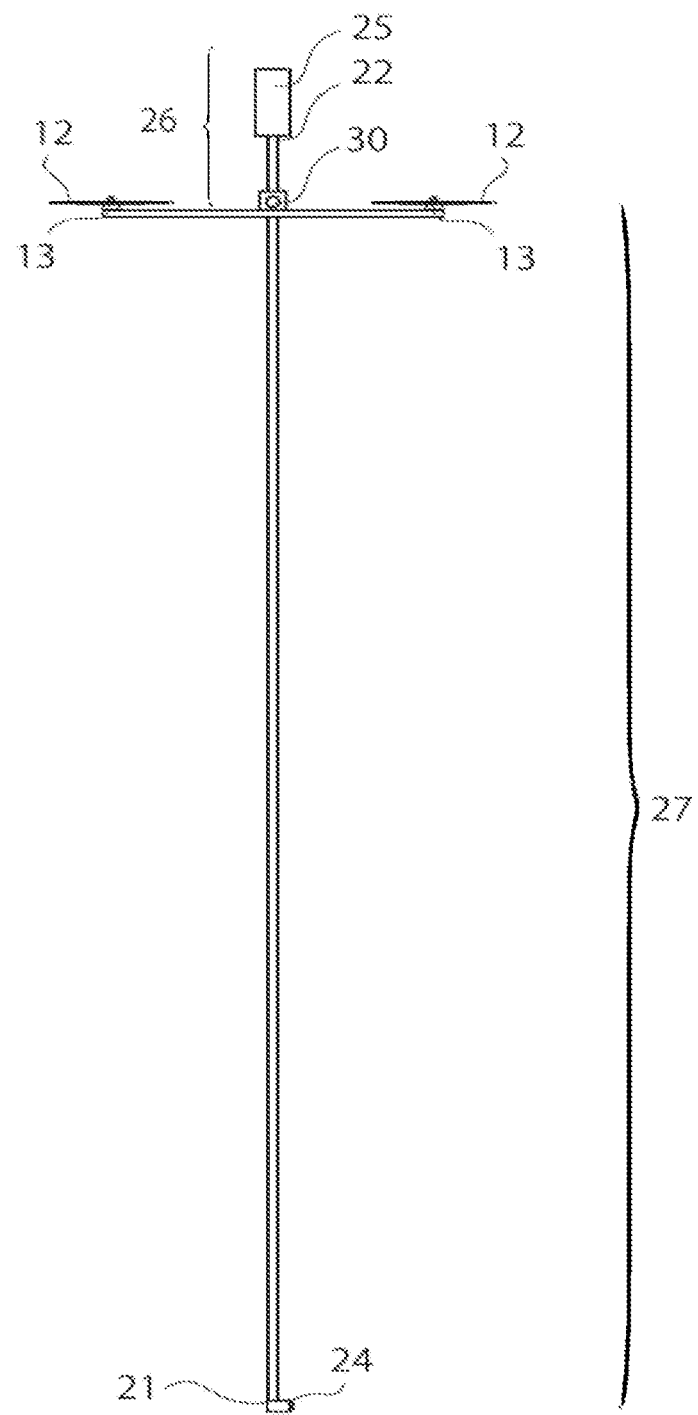

[FIG. 4]
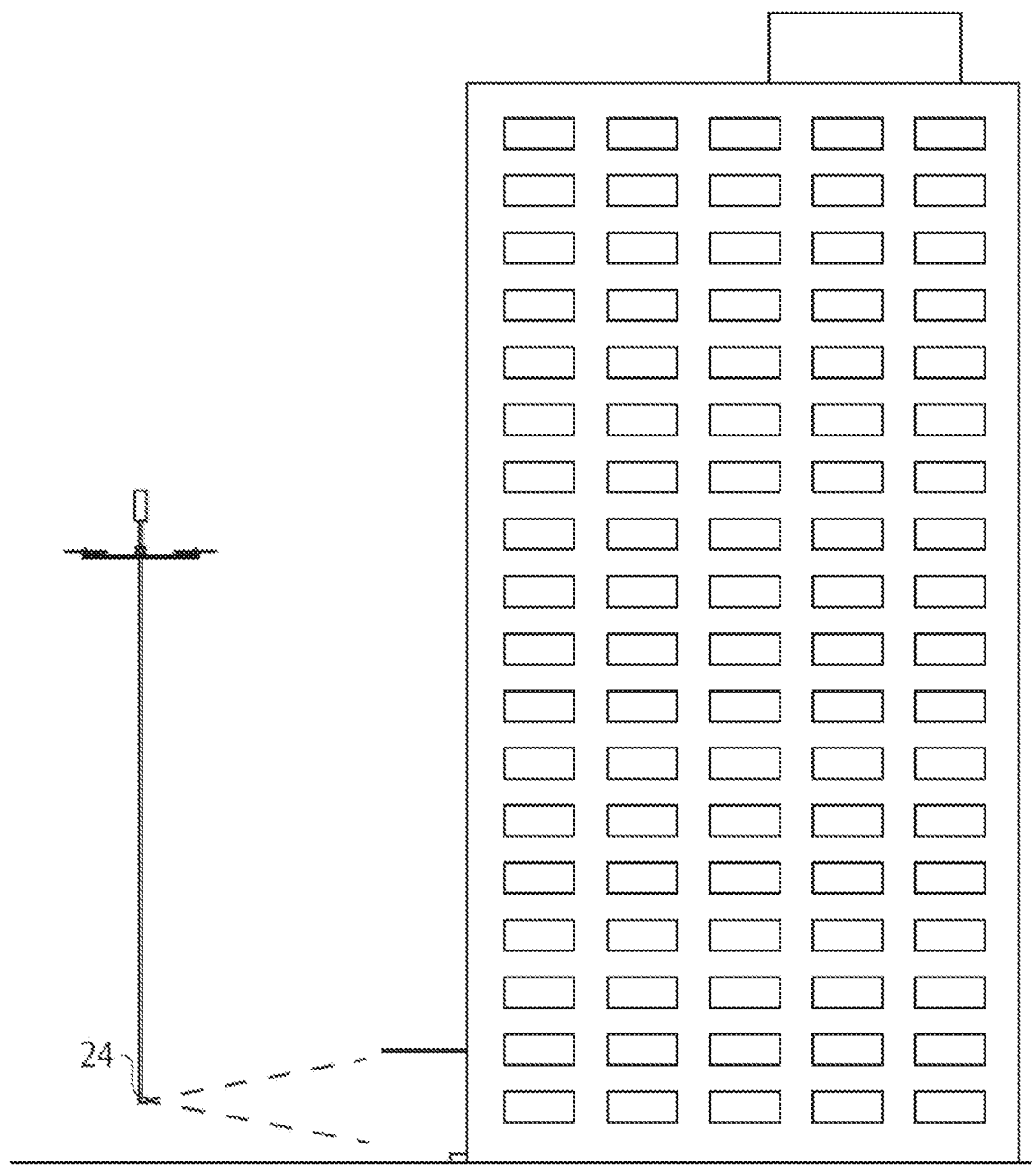

[FIG. 5]
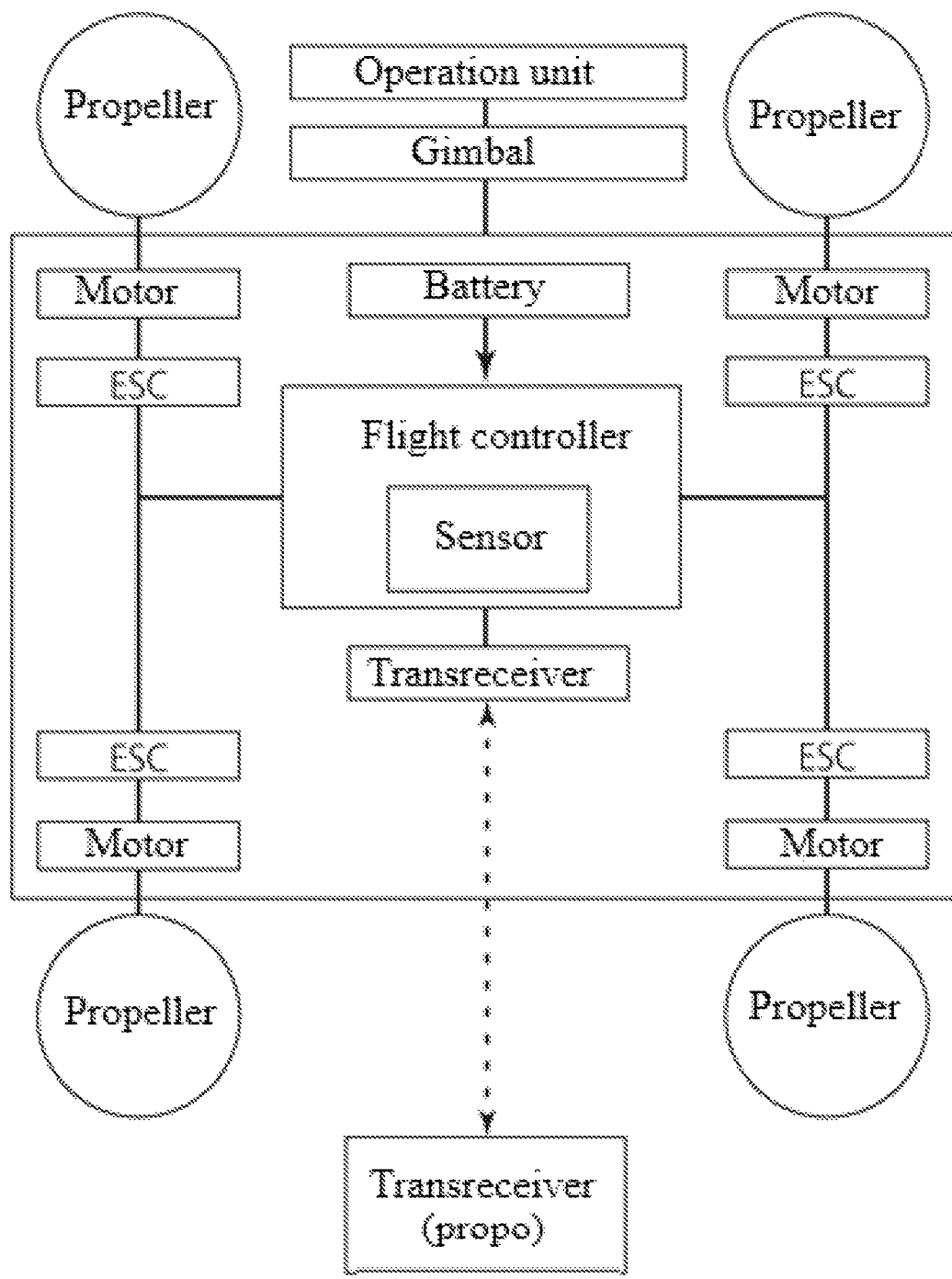

[FIG. 6]
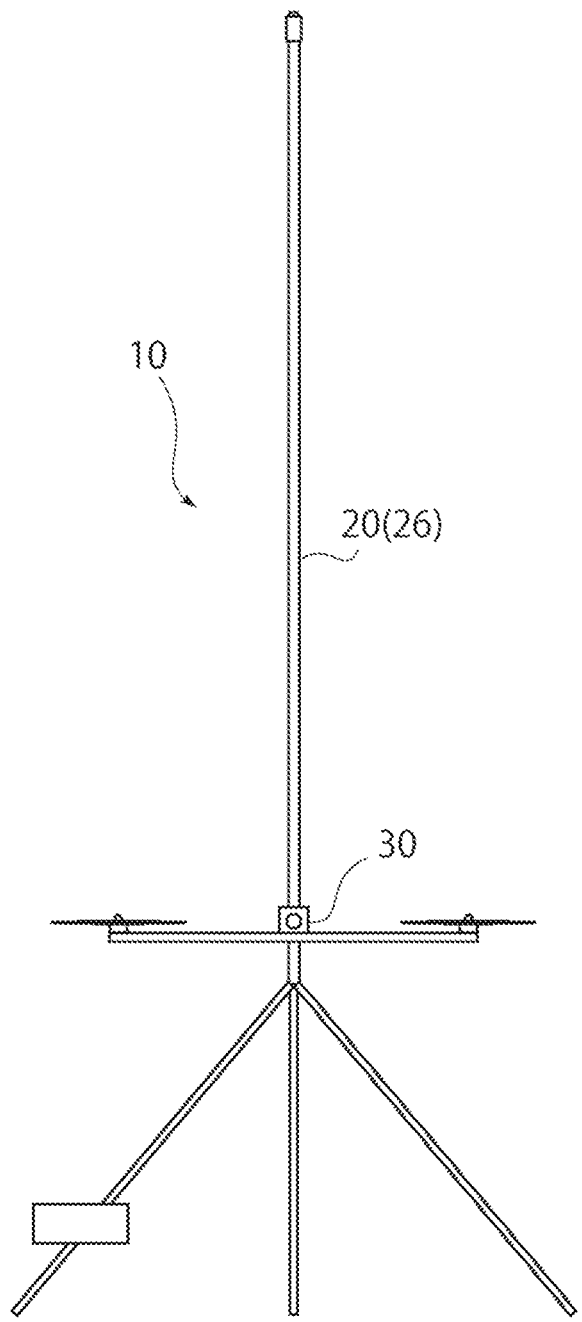

[FIG. 7]
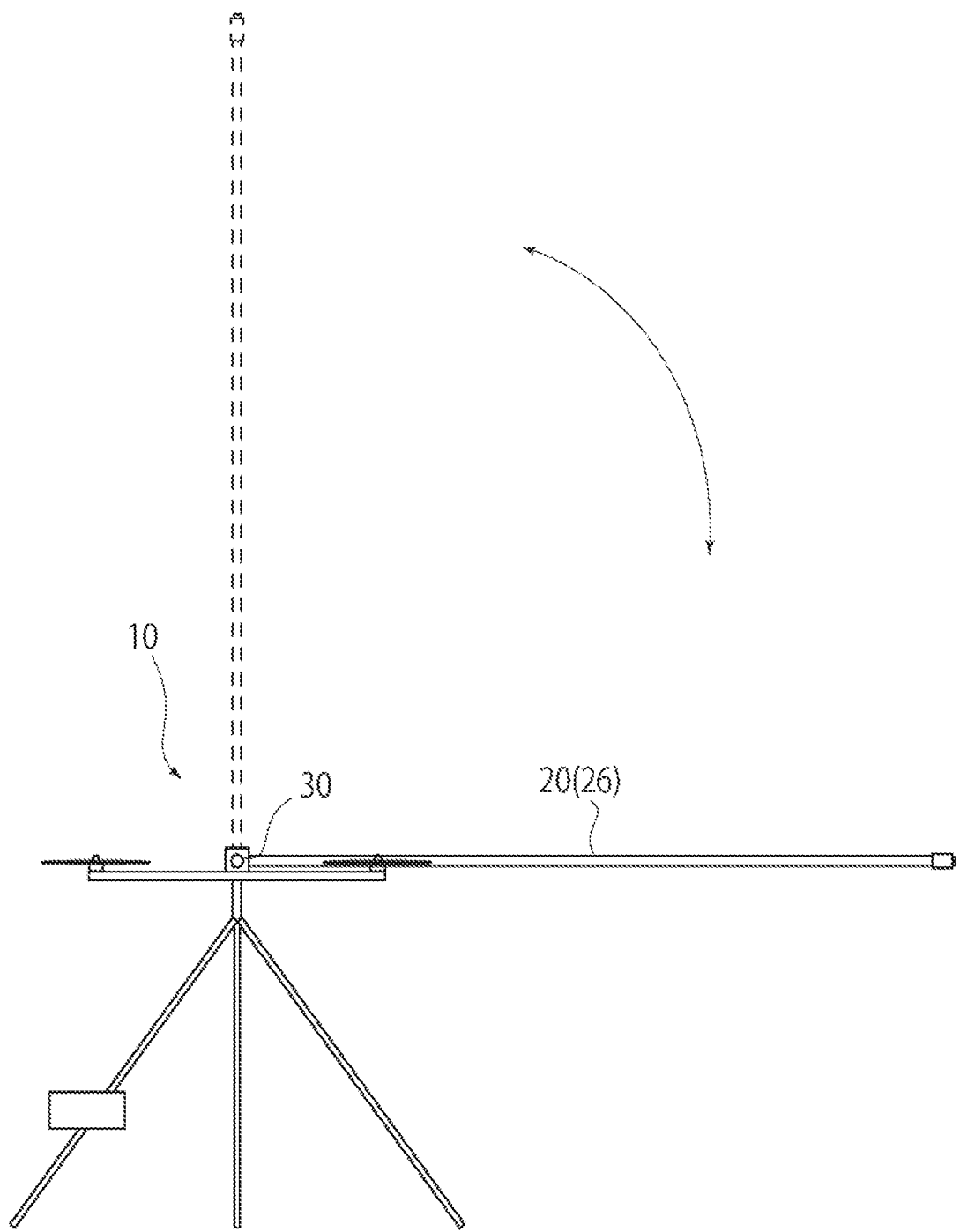

[FIG. 8]
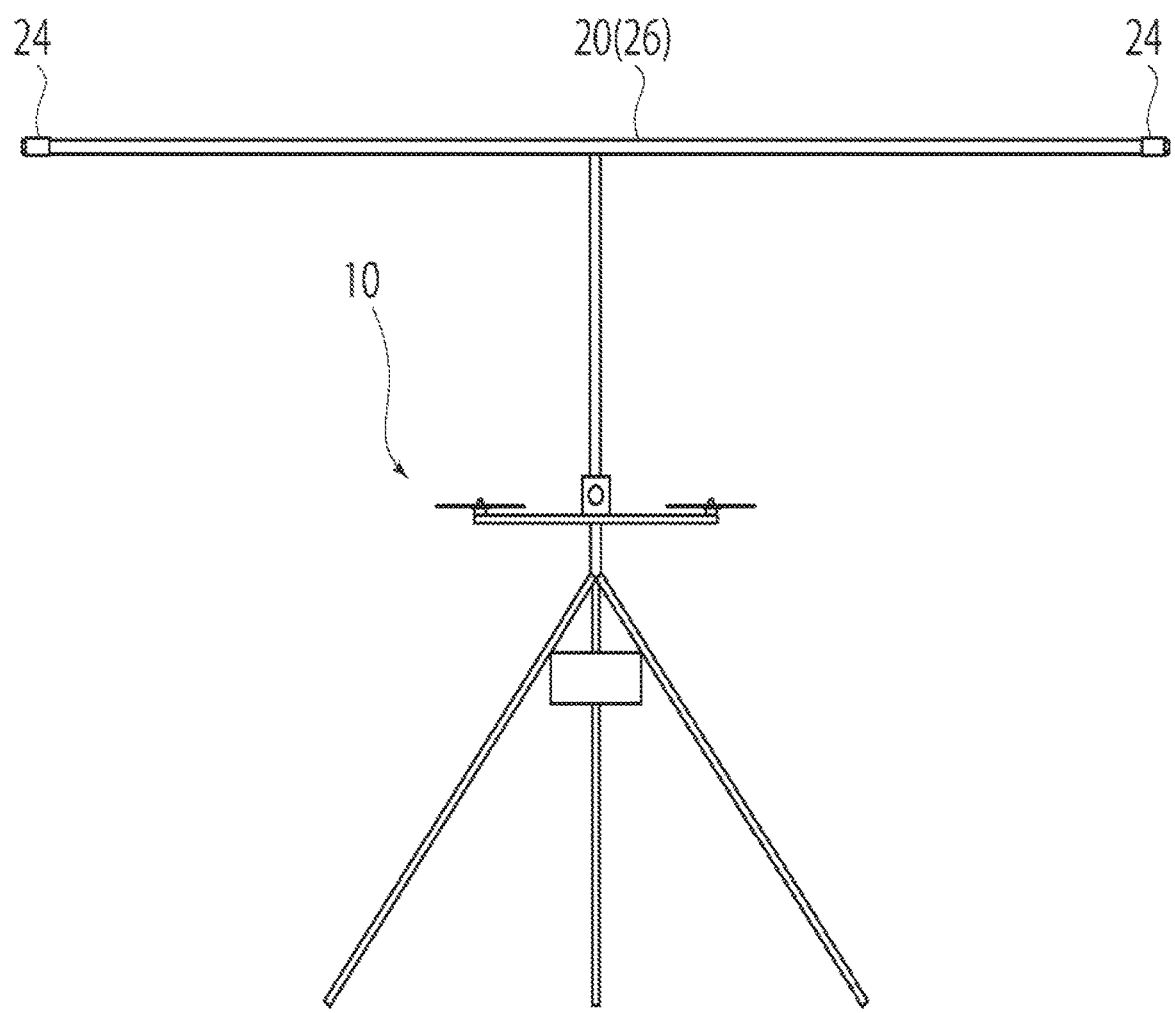

[FIG. 9]
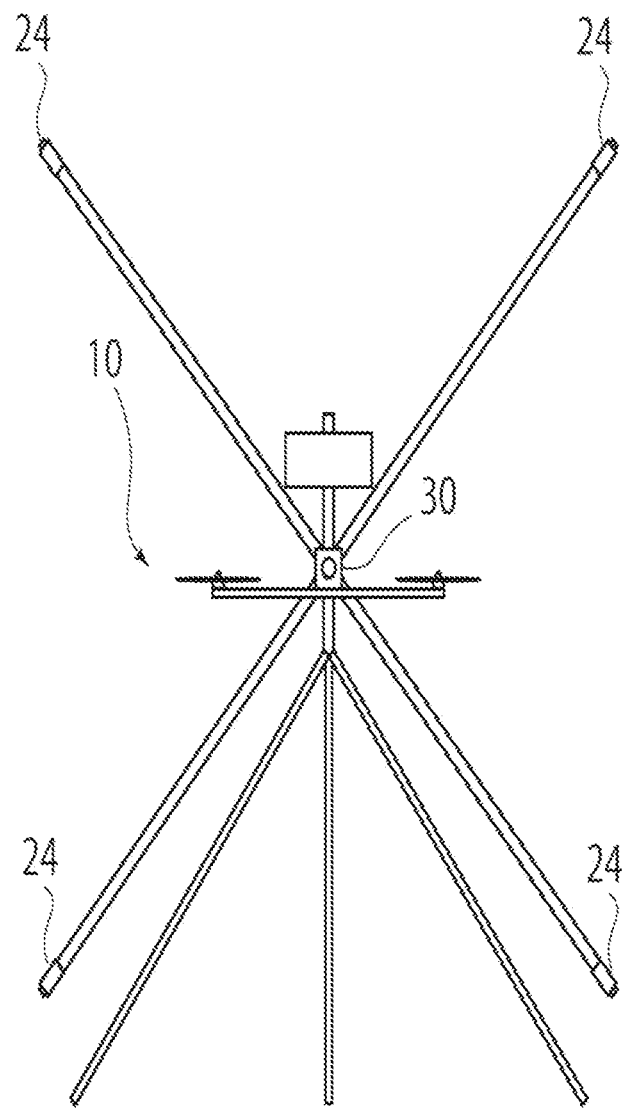

[FIG. 10]
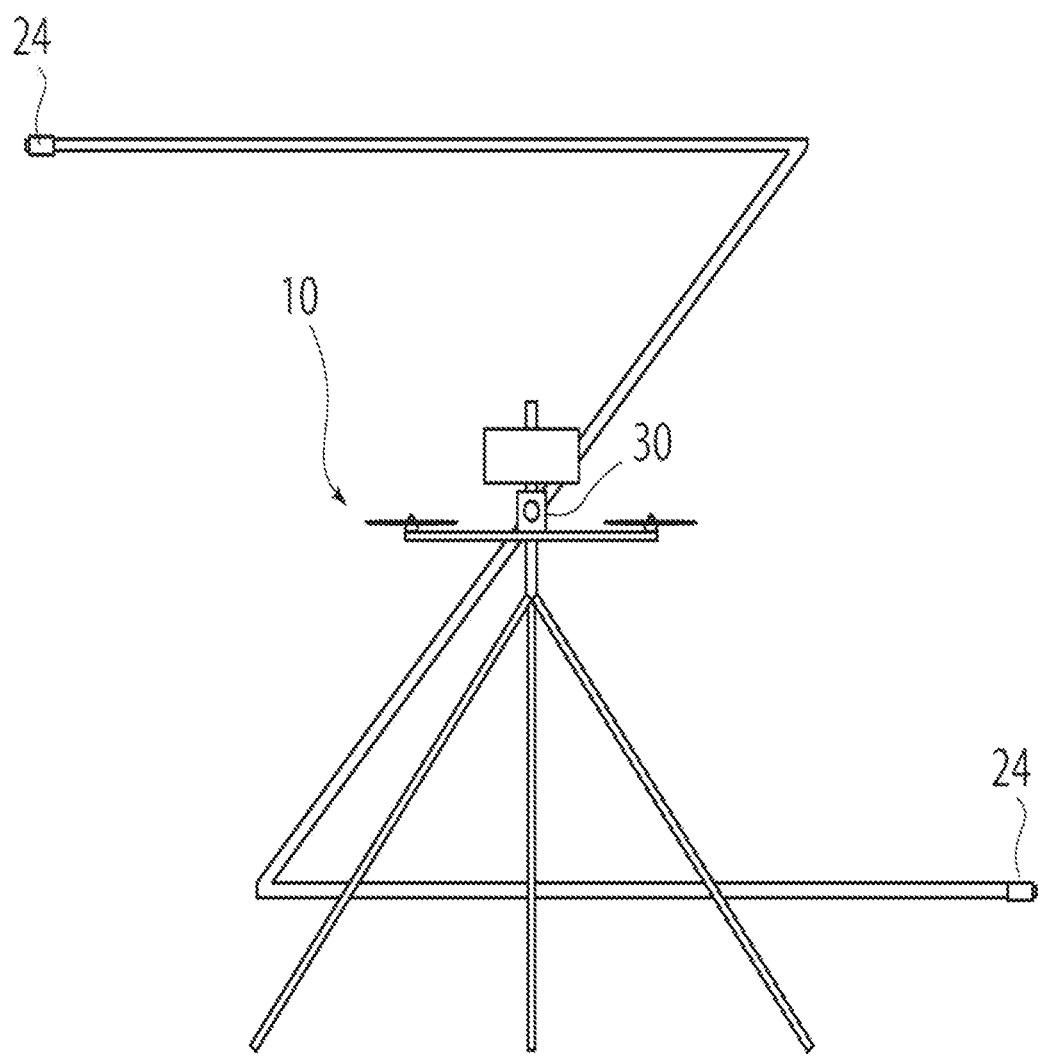

[FIG. 11]
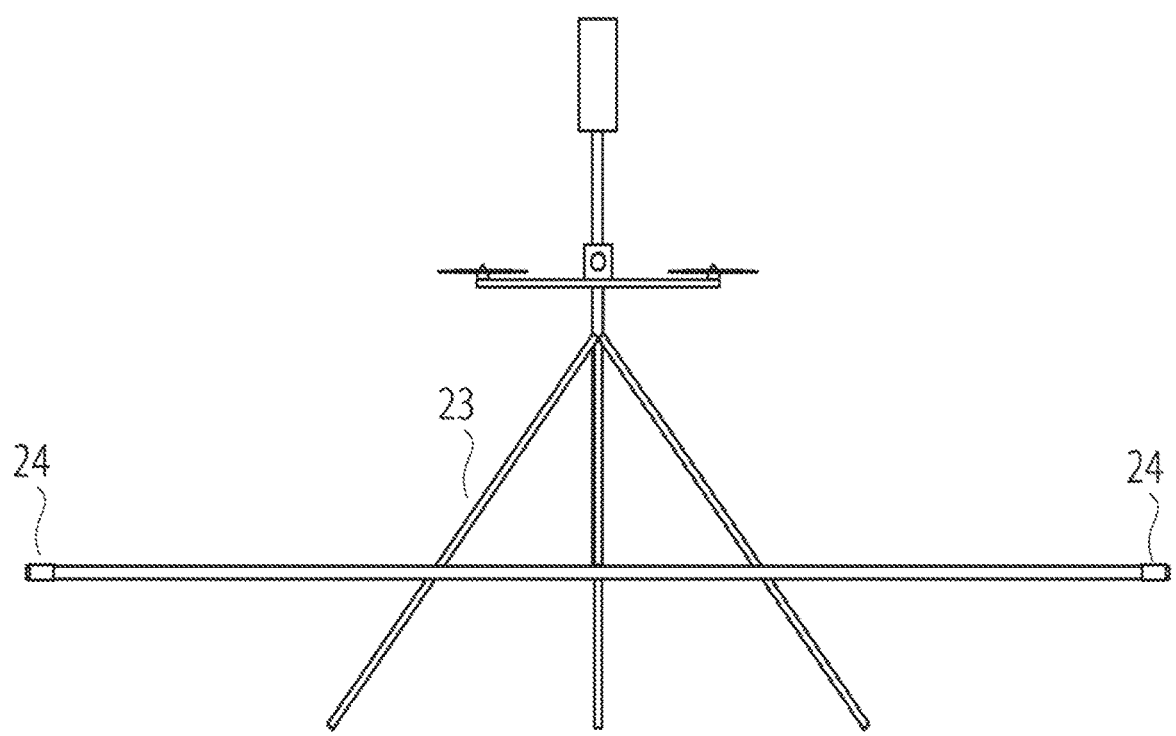

FLYING OBJECT WITH ELONGATED BODY

TECHNICAL FIELD

The present disclosure relates to a flying object including an elongated main body.

BACKGROUND ART

In recent years, various services have been provided using a rotary-wing aircraft such as a drone or unmanned aerial vehicle (UAV) (hereinafter, collectively called "rotary-wing aircraft) used for various purposes. Such a rotary-wing aircraft can be equipped with various operation parts such as a camera or a sensor, a sprayer, a speaker, and the like, and so the range of industrial application is being further expanded.

When a rotary-wing aircraft is equipped with a working part, in many models, the working part is fixed to an upper part or a lower part of the rotary-wing aircraft. However, in that case, the mounting of the working part as a free load may cause the rotary-wing aircraft to lose its balance, deteriorating the flight efficiency or making it unstable to fly.

Meanwhile, Patent Literature 1 provides a mechanism that can continue a stable flight with little difference between rotary wings, even in a rotary-wing aircraft in which a heavy load is provided vertically below the rotary-wing aircraft (see, for example, Patent Literature 1).

CITATION LIST

Patent Literature

[Patent Literature 1] WO2016/185572

SUMMARY OF THE INVENTION

Technical Problem

In Patent Literature 1, a rotary-wing aircraft having a heavy load such as a camera is configured such that the center of lift generated in an airframe by rotating a plurality of rotary wings is positioned at a connection part between an arm part that support the rotary wing and a mounting part that mounts a heavy load. This makes it possible to continue stable flight with little difference between rotary wings.

However, when the working part provided in the flying object in Patent Document 1 is used, the working part is affected by various factors such as wind and sound generated from the flying object. Further, it is necessary for the main body of the flying object to approach a working target (for example, animals and plants to be investigated, a person to be monitored, a building to be worked on, etc.).

Depending on the working target, the work may not proceed smoothly because the flying object must approach the target suitably close enough for the work. For example, in the case of monitoring or survey, the posture and sound of the flying object may affect the target, therefore the work itself cannot be performed. In addition, when the work place is narrow, the flying object may not be able to enter, or there may be a risk of contact or the like upon entry.

Therefore, one object of the present disclosure is to provide a flying object in which a working part is provided at a position away from the flying object, the main body of the flying object maintains a distance from a working target, and the working part can be close to the working target at an appropriate distance while maintaining a position enabling safe flight.

Technical Solution

According to the present disclosure, there can be provided a flying object including: a flight part including at least a plurality of rotary wings and a motor for driving the rotary wings, a main body elongated in a vertical direction, and a connection part that connects the flight part and the main body in a mutually displaceable manner, wherein the total length of the main body in the vertical direction is at least twice the maximum diameter of the flight part in a horizontal direction.

Advantageous Effects

According to the present disclosure, there can be provided a flying object in which a main body of the flying object keeps a distance from a working target, and a working part can be close to the working target at an appropriate distance while maintaining a position which enables safe flight.

BRIEF DESCRIPTION OF THE DRAWINGS

FIG. 1 is a side view of a rotary-wing aircraft according to the present disclosure.

FIG. 2 shows a use example of the rotary-wing aircraft of FIG. 1.

FIG. 3 is a side view of another rotary-wing aircraft according to the present disclosure.

FIG. 4 shows a use example of the rotary-wing aircraft of FIG. 3.

FIG. 5 is a functional block diagram of the rotary-wing aircraft of FIG. 1.

FIG. 6 is a side view of yet another rotary-wing aircraft according to the present disclosure.

FIG. 7 shows a working example of the rotary-wing aircraft of FIG. 6.

FIG. 8 is a side view of still another rotary-wing aircraft according to the present disclosure.

FIG. 9 is a side view of yet another rotary-wing aircraft according to the present disclosure.

FIG. 10 is a side view of still another rotary-wing aircraft according to the present disclosure.

FIG. 11 is a side view of still another rotary-wing aircraft according to the present disclosure.

DETAILED DESCRIPTION OF THE EMBODIMENTS

The contents of the embodiment of the present disclosure will be listed and described. The flying object including an elongated main body according to an embodiment of the present disclosure has the following configuration.

[Item 1]

A flying object including: a flight part including at least a plurality of rotary wings and a motor for driving the rotary wings, a main body elongated in a vertical direction, and a connection part that connects the flight part and the main body in a mutually displaceable manner, wherein a total length of the main body in the vertical direction is at least twice a maximum diameter of the flight part in a horizontal direction.

[Item 2]

The flying object as set forth in Item 1, wherein the main body has an upper part that is provided above the connection part and a lower part that is provided below the connection part, and the length of the upper part is three times or more the length of the lower part.

[Item 3]

The flying object as set forth in Item 2, wherein the lower part has a structure for at least balancing with the upper part.

[Item 4]

The flying object as set forth in any one of Items 1 to 3, wherein the connection part is provided at a center of gravity or an approximate center of gravity of the main body.

[Item 5]

The flying object as set forth in any one of Items 1 to 4, wherein a working part can be mounted to the tip of the upper part.

[Item 6]

The flying object as set forth in any one of Items 1 to 5, wherein the lower part includes a leg part.

[Item 7]

The flying object as set forth in Item 1, wherein the main body has an upper part that provided above the connection part, and a lower portion that is provided below the connection part, and the length of the lower part is three times or more the length of the upper part.

[Item 8]

The flying object as set forth in Item 7, wherein the lower part has a structure for at least balancing with the upper part.

[Item 9]

The flying object as set forth in Items 7 or 8, wherein the connection part is provided in a center of gravity or an approximate center of gravity of the main body.

[Item 10]

The flying object as set forth in any one of Items 7 to 9, wherein a working part can be mounted to the tip of the lower part.

[Item 11]

The flying object as set forth in any one of Items 1 to 6, wherein the flight part is configured to be movable in the vertical direction along the main body.

DETAILS OF EMBODIMENTS ACCORDING TO THE PRESENT DISCLOSURE

Hereinafter, the flying object including an elongated main body according to embodiments of the present disclosure will be described with reference to the accompanying figures.

Details of First Embodiment According to the Present Disclosure

As shown in FIG. 1, a rotary-wing aircraft 10 according to an embodiment of the present disclosure includes a flight part 11 including a plurality of rotary wings 12 and a motor 13 for driving the rotary wings 12, a main body 20 elongated in a vertical direction, and a connection part 30 that connects the flight part 11 and the main body 20 in a mutually displaceable manner.

Since the flight part 11 and the main body 20 are displaceable from each other, the state of the main body 20, and a working part 24 mounted on a first mounting part 21 and a second mounting part 22 can be maintained in a state of being suspended vertically downward from the rotary-wing aircraft 10 by the action of gravity, irrespective of the posture of the flight part. In this case, since the posture is maintained by the action of gravity, the connection part does not require a driving mechanism or the like, and a simple configuration becomes possible. Further, it is possible to tilt it to an arbitrary angle by using a driving mechanism or the like.

The total length of the main body 20 in a vertical direction is at least twice the maximum diameter of the flight part 11 in a horizontal direction. By making the main body longer, the first mounting part 21 and the second mounting part 22 can be separated from the flight part 11.

The main body 20 has an upper part 26 that is provided above a connection part 30, and a lower part 27 that is provided below the connection part 30. The length of the upper part 26 is equal to or more than three times the length of the lower part 27. By making the length to be longer upward in the vertical direction, the convenience of the working part 24 can be improved. The utilization of the working part 24 will be described hereinafter.

The lower part 27 may be provided with a structure of a counterweight or the like in order to balance the upper part 26. If the lower part 27 and the upper part 26 are balanced, when the main body 20 is operated to be tilted at an arbitrary angle by using a driving mechanism or the like, the force required by the driving mechanism is less than when tilting the main body 20 where the lower part 27 and the upper part 26 are not balanced.

Further, the same effect can be obtained by providing the connection part 30 at a center of gravity or an approximate center of gravity of the main body 20. When the connection part 30 is provided so as to be located at the center of gravity or the approximate center of gravity of the flight body, the rotation speeds of the plurality of motors 13 included in the flight part 11 are made uniform, and the flight efficiency is improved. When the connection part 30 is provided so as to be located at a buoyancy center position or an approximate buoyancy center position of the flying object, the tilting of the flight part 11 with respect to the connection part 30 can be increased, and thus, the working part can be shifted in the horizontal direction.

The working part 24 can be attached to the tip of the upper part 26 to perform work. The working part and the work performed by the working part includes, for example, photographing, monitoring, surveying, recording, etc. by information acquisition devices that can acquire an outside-world information such as cameras, sensors, and microphones, liquid spraying, painting, fire extinguishing, water sprinkling to animals and plants by a sprayer, a spraying device, and a water spray device, appealing to outside by a speaker, an odor generator, and a light emitting device, work and maintenance by a tool and a robot arm, movement of objects, and the like, without being limited thereto.

For example, when an information acquisition device is attached and used, it can be used as a periscope by increasing the length of the upper part 26.

As shown in FIG. 2, when a monitoring target person exists at a high place in a building, only the working part 24 is positioned at the required height, and the flight part 11 and the lower part 27 are kept in a position that is not visible to the target person, thereby improving invisibility and preventing detection by flight noise, and further maintaining a low flight altitude and thus improving safety.

In addition, for the target person to be monitored located at a higher altitude than the flight position, such as trees, bridges, and cliffs, it is, similarly, possible to improve invisibility, prevent the detection by flight noise, and keep the flight altitude low and so improve safety. Further, information can be acquired by inserting only the working part 24 into a narrow space or the like where the flight part 11 cannot enter.

As shown in FIG. 2, the rotary-wing aircraft 10 may be moored to the ground or to a device by a cable or the like. For example, when connected to a ground power supply device using a composite cable for mooring, it is possible to operate for a long time by receiving power supply, to transmit and receive data by wire, and at the same time, to limit the activity range of the rotary-wing aircraft 10, and to keep safety for persons and objects outside the planned activity range. In addition, the weight of the cable can also provide a self-leveling effect on the main body 20.

As shown in FIG. 1, the lower part 27 may be provided with a leg part 23 that can be used for landing or the like, if necessary, and by providing the leg part, landing and takeoff can be easily performed, and additionally, work can be performed on the ground even whiling not in flight.

Details of Second Embodiment According to the Present Disclosure

Regarding the details of the second embodiment according to the present disclosure, since the components overlapping with the first embodiment perform the same operation, again repeated description will be omitted.

The main body 20 has an upper part 26 that is provided above the connection part 30, and a lower part 27 that is provided below the connection portion 30. The length of the lower part 27 is more than three times the length of the upper part 26. By specializing the length to be longer upward in the vertical direction, the convenience of the working part 24 can be improved.

The upper part 26 may be provided with a structure of counterweight or the like in order to balance the lower part 27. If the upper part 26 and the lower part 27 are balanced, when the main body 20 is operated to be tilted at an arbitrary angle by using a driving mechanism or the like, the force required by the driving mechanism is less than when tilting the main body 20 where the upper part 26 and the lower part 27 are not balanced.

Further, the same effect can be obtained by providing the connection part 30 at a center of gravity or an approximate center of gravity of the main body 20. When the connection part 30 is provided so as to be located at the center of gravity or the approximate center of gravity of the entire flight vehicle, the rotation speeds of the plurality of motors 13 included in the flight part 11 are made uniform, and the flight efficiency is improved. When the connection part 30 is provided so as to be located at a buoyancy center position or an approximate buoyancy center position of the flying object, the tilting of the flight part 11 with respect to the connection part 30 can be increased, and thus, the working part can be shifted in the horizontal direction.

As shown in FIG. 3, a working part 24 can be attached to a tip of a lower part 27. The working part 24 is the same as in the example of the working part previously described.

For example, when an information acquisition device is attached and used, it can be used as a reverse periscope by increasing the length of the lower part 27.

For example, as shown in FIG. 4, when there is a monitoring target person downstairs in the building, and the like, only the working part 24 is located at the required height, and the flight part 11 and the upper part 26 are kept in a position that is not visible to the target person, thereby being able to improve the invisibility and prevent the detection of by flight noise.

In addition, for the monitoring target person located at a lower altitude than the flight position, such as trees, bridges, and under cliffs, it is, similarly, possible to improve invisibility, to prevent the detection by flight noise, and to keep the flight altitude low and so improve safety. Further, information can be acquired by inserting only the working part 24 into a narrow space or the like where the flight part 11 cannot enter.

The target person could be, for example, a criminal at a time of terrorism or a criminal act, a rescue target person at a time of an incident, an accident, a disaster, etc., or a person or an organism, etc. that is being investigated.

Details of Third Embodiment According to the Present Disclosure

The flight part 11 may be configured to be movable in the vertical direction along the main body 20, and may move to the center of gravity or the approximate center of gravity of the main body 20 to facilitate tilting of the main body 20. When grounding in the takeoff and landing position, it is possible to perform operations, such as moving to the bottom of the main body 20 so that the flight part 11 can be grounded.

The above-mentioned rotary-wing aircraft has the functional block shown in FIG. 5. Further, the functional block in FIG. 5 has a minimum reference configuration. The flight controller is a so-called processing unit. The processing unit may have one or more processors, such as a programmable processor (e.g., central processing unit (CPU)). The processing unit has a memory (not shown), and can access the memory. The memory stores logic, code, and/or program instructions that the processing unit can execute to perform one or more steps. The memory may include, for example, a separable medium such as an SD card or random access memory (RAM) or an external storage device. Data acquired from the cameras and/or sensors may be transmitted directly to the memory and stored. For example, still image/dynamic image data taken by a camera or the like is recorded in a built-in memory or an external memory.

The processing unit includes a control module configured to control the state of the rotary-wing aircraft. For example, the control module may control a propulsion mechanism (motor and the like) in order to adjust the spatial arrangement, velocity, and/or acceleration of the rotary-wing aircraft having six degrees of freedom (translational motions x, y, and z, and rotational motions Ox, Oy, and Oz). The control module can control one or more of the states of a mounting part and sensors.

The processing unit can communicate with a transreceiver configured to send and/or receive data from one or more external devices (e.g., a terminal, display device, or another remote controller). The tranresceiver can use any suitable communication means such as wired or wireless communication. For example, the transreceiver can use one or more of a local area network (LAN), a wide area network (WAN), infrared, wireless, WiFi, point-to-point (P2P) network, telecommunication network, cloud communication, and the like. The tranresceiver can transmit and/or receive one or more of, data acquired by sensors, process results generated by the processing unit, predetermined control data, user command from a terminal or a remote controller, and the like.

Sensors according to the present embodiment may include an inertial sensor (an acceleration sensor, a gyro sensor), a GPS sensor, a proximity sensor (e.g., LiDAR), or a vision/image sensor cameras).

<Variation 1>

As shown in FIGS. 6 and 7, the rotary-wing aircraft 10 may include an upper part 26 capable of rotating and bending around the connection part 30. This makes it possible to perform upward and lateral (horizontal) inspections, etc. with a single rotary-wing aircraft.

<Variation 2>

As shown in FIG. 8, the rotary-wing aircraft 10 may include an upper part 26 extending in a T shape from the connection part 30. The upper part 26 extends from the midpoint in two horizontal directions (for example, both directions of 180 degrees as shown), and a working part 24 is mounted on each tip. This makes it possible to perform lateral (horizontal) inspections and the like with a single rotary-wing aircraft. Further, by providing a camera having a wide angle or a viewing angle of 180 degrees or more as the working part 24 at both ends, it is possible to perform an inspection in a wide range.

<Variation 3>

As shown in FIG. 9, the rotary-wing aircraft 10 may be connected to a connection part 30 and may include a portion extending in at least four directions, and an working part 24 is mounted on the tip of each part.

<Variation 4>

As shown in FIG. 10, the rotary-wing aircraft 10 may be connected to the connection part 30 and include a Z-shaped portion. A working part 24 is mounted on each end of the portion (that is, the tips of the portions extending in the opposite direction to the horizontal direction).

<Variation 5>

As shown in FIG. 11, the rotary-wing aircraft 10 may have a portion extending in the horizontal direction on the leg part 23. A working part 24 is mounted on each end of the portion.

The rotary-wing aircraft of the present disclosure can be expected to be used as a rotary-wing aircraft for monitoring and survey work, and as an industrial rotorcraft in warehouses, factories or outdoors. In addition, the rotary-wing aircraft of the present disclosure can be used in airplane-related industries such as multicopters and drones. Furthermore, the present disclosure can be used as a rotary-wing aircraft for survey equipped with a camera or the like, and also can be used in various industries such as security, agriculture, research, in case of disaster, and infrastructure monitoring.

The above-described embodiment is merely an example for facilitating the understanding of the present disclosure and should not be construed as limiting the present disclosure. It goes without saying that the present disclosure can be modified and improved without departing from the spirit thereof, and the present disclosure includes an equivalent thereof.

DESCRIPTION OF REFERENCE NUMERALS 10 rotary-wing aircraft
11 flight part
12 rotary wing
13 motor
20 main body
21 first mounting part
22 second mounting part
23 leg part
24 working part
25 counterweight
26 upper part
27 lower part
30 connection part
40 cable
41 ground power supply

The invention claimed is:

1. A flying object comprising:
a flight part including at least a plurality of rotary wings and a motor for driving the rotary wings;
a main body elongated in a vertical direction; and
a connection part that connects the flight part and the main body in a mutually displaceable manner, as a posture of the main body is being maintained irrespective of a posture of the flight part,
a working part mounted to the main body,
wherein the main body has an upper part that is provided above the connection portion, and a lower portion that is provided below the connection portion, and a length of the upper part is different from a length of the lower part,
wherein the flight part is fixed at a longitudinal position of the main body by the connection part.

2. The flying object according to claim 1,
wherein the length of the upper part is three times or more the length of the lower part.

3. The flying object according to claim 2,
wherein the lower part has a structure for at least balancing the upper part.

4. The flying object according to claim 1,
wherein the connection part is provided at a center of gravity or an approximate center of gravity of the main body.

5. The flying object according to claim 2,
wherein the connection part is provided at a center of gravity or an approximate center of gravity of the main body.

6. The flying object according to claim 3,
wherein the connection part is provided at a center of gravity or an approximate center of gravity of the main body.

7. The flying object according to claim 1,
wherein the working part can be mounted to a tip of the upper part.

8. The flying object according to claim 2,
wherein the working part can be mounted to a tip of the upper part.

9. The flying object according to claim 3,
wherein the working part can be mounted to a tip of the upper part.

10. The flying object according to claim 4,
wherein the working part can be mounted to a tip of the upper part.

11. The flying object according to claim 5,
wherein the working part can be mounted to a tip of the upper part.

12. The flying object according to claim 6,
wherein the working part can be mounted to a tip of the upper part.

13. The flying object according to claim 1,
wherein the lower part includes a leg part.

14. The flying object according to claim 1,
wherein the length of the lower part is three times or more the length of the upper part.

15. The flying object as set forth in claim 14,
wherein the lower part has a structure for at least balancing the upper part.

16. The flying object according to claim 14,
wherein the connection part is provided at a center of gravity or an approximate center of gravity of the main body.

17. The flying object according to claim 15,
wherein the connection part is provided at a center of gravity or an approximate center of gravity of the main body.
18. The flying object according to claim 14,
wherein the working part can be mounted to a tip of the lower part.
19. The flying object according to claim 1,
wherein the flight part is configured to be movable in the vertical direction along the main body.

* * * * *